United States Patent Office 2,950,703
Patented Aug. 30, 1960

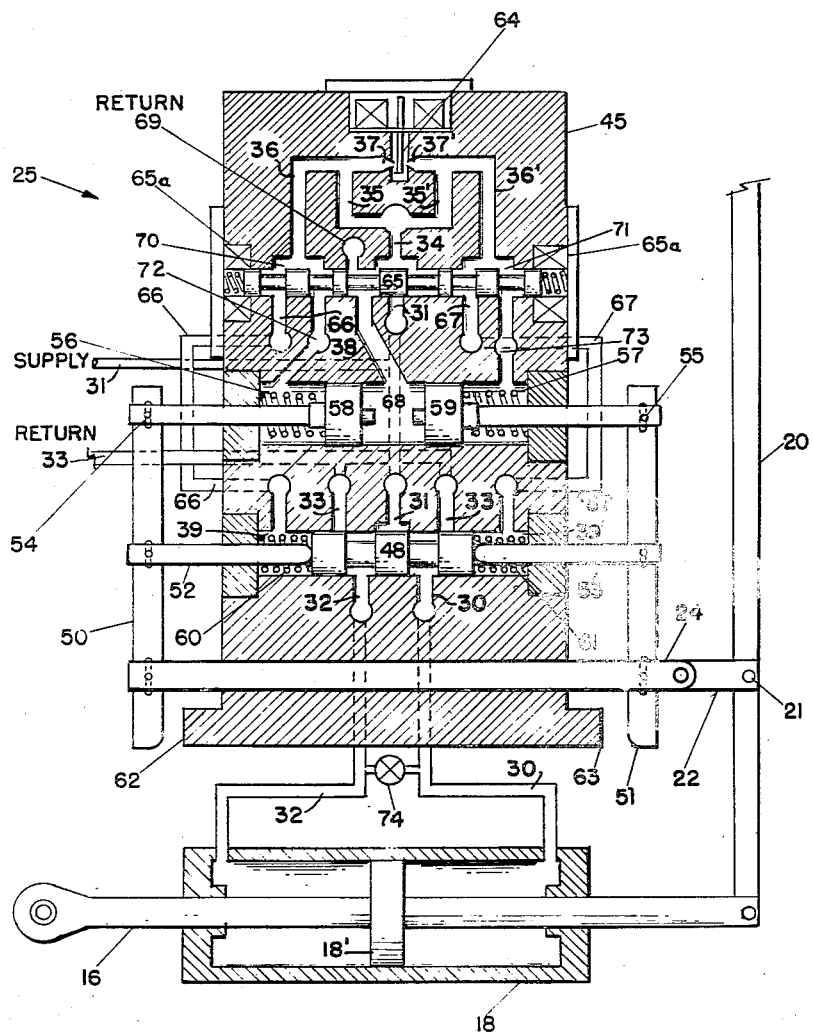

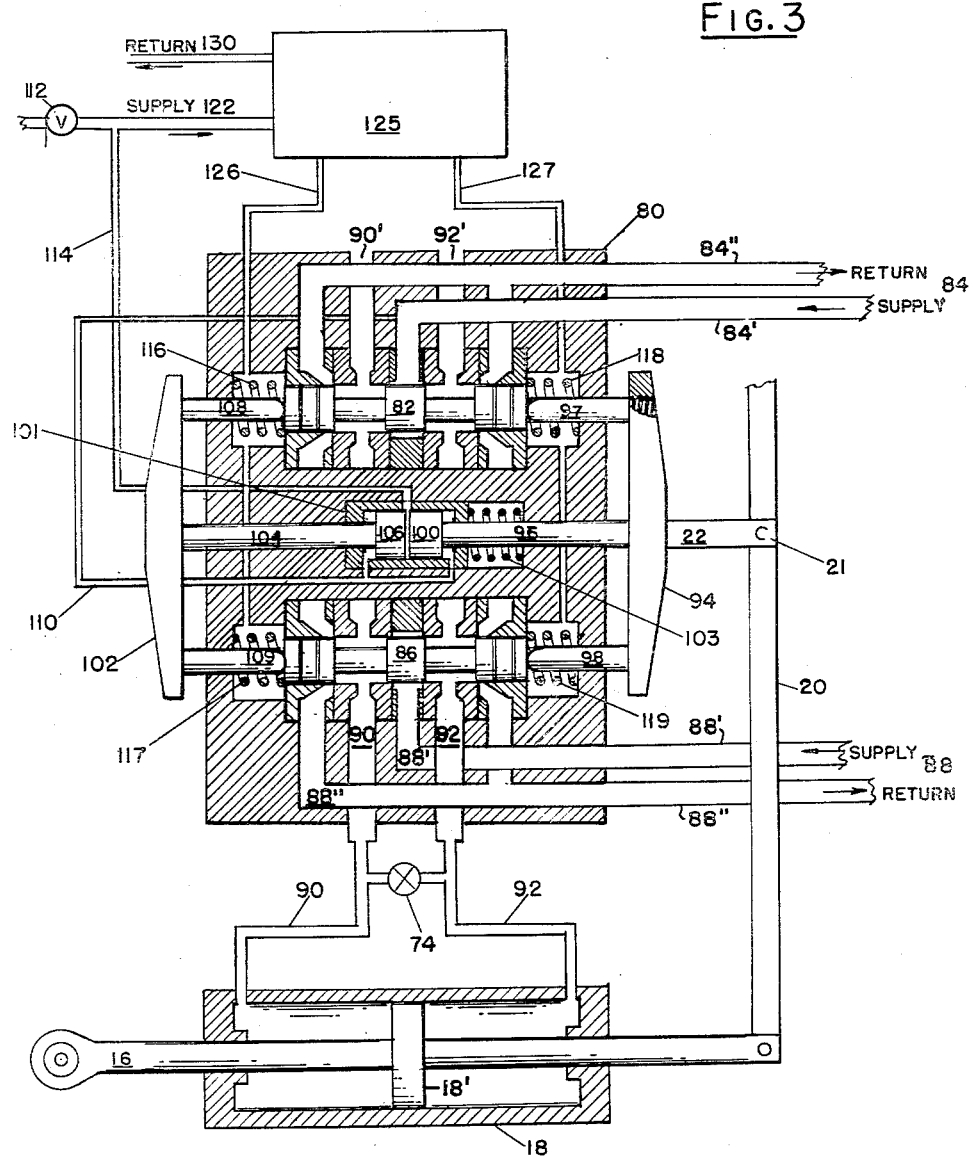

2,950,703

MANUAL AND AUTOMATIC HYDRAULIC SERVOMECHANISM

Harold K. Fletcher, Kenmore, N.Y., Woodrow Seamone, Rockville, Md., and Martin P. Wolpin, Tonawanda, N.Y., assignors, by mesne assignments, to Bell Aerospace Corporation, Wheatfield, N.Y., a corporation of Delaware Filed Nov. 7, 1956, Ser. No. 620,825

Claims. (Cl. 121—41)

This invention relates to aircraft control systems, and the like, of the types employing combinations of hydraulic, mechanical and electrical components; and more particularly to improvements in servomechanisms in hydraulic control systems such as are useful for example in moving aerodynamic control surfaces of aircraft, or the like.

The trend recently current in the design of control systems for present day high performance aircraft has been toward fully hydraulic powered systems. These systems are basically irreversible in that the pilot feels none of the air load forces from the control surface, and therefore an artificial feel device is usually added to furnish a normal proportional force reaction at his control stick or pedals. Also, an ever increasing emphasis is currently noted toward automatic aircraft control, not only for the usual autopilot functions of holding a set course and altitude, but also for such flight path control purposes as to assist in fire control, automatic landing and navigation. A still further requirement has materialized, calling for means of augmenting the basic airframe stability during certain airspeed ranges. The conventional method of coupling a flight path control system to the aircraft's power control system has been to connect a positional servo motor to the pilot's control linkage, thereby paralleling the pilot's actuation of his power control valve. This type system is defined as a parallel type autopilot, and the conventional method of effecting stability augmentation has been to insert a differential actuator in series with the pilot's control linkage, thereby superimposing short term stabilizing control movements upon the pilot's long term positional reference. This differential action is intended to reflect a minimum of the transient control forces back to the pilot's stick or pedals.

These prior control coupling methods have several inherent disadvantages. With the parallel type autopilot the response requirements of the servo motor have become quite high, which demands a fairly powerful and high performance servo motor. Thus a unit weighing 6 to 8 pounds is required for the principal purpose of driving the pilot's stick or pedals at the accelerations needed for airframe stability. Although the differential actuator type of control does not have to drive as large an inertia as the parallel actuator, its response requirements under certain conditions may be even higher than those of the parallel actuator. In some cases this has required the use of a hydraulic servo. Thus, in such systems requiring autopilot and stabilization, there are three separate mechanisms for achieving the required control; the power valve actuator, the parallel actuator, and the differential actuator. The overall weight and complexity penalties are very substantial.

The object of the present invention is to provide a means for meeting the above control requirements comprising a self-contained mechanism which actuates the power valve spools directly through application of control pressures at the ends of the same, and which utilizes a negligible amount of power from the main control actuator to perform the task of driving the control linkage and stick (or pedals) so as to follow the control movements in autopilot mode of operation. A means is included for decoupling the power spools from the restraining inertia of the control stick (or pedals) and linkage. The mechanism incorporates also a differential linkage with mechanical feedback for operation in the stabilization or damper mode of operation.

Otherwise stated, the invention provides an improved integrated autopilot servo valve and power control valve mechanism, for aircraft control systems or the like; and incorporates features providing for mechanical override of the electrical input signals during autopilot operations. It may also function as a power control mechanism supplementing the pilot's manual control. Another feature of the mechanism of the invention is that it includes improved means insuring synchronized "cut-in" and "cut-out" of the autopilot without restriction against transfer of the controls from autopilot to the pilot manual control modes of operation.

It is a particular feature of the present invention that the autopilot and power control and damper mode functions of the devices are combined into one basic controller, whereby the device requires only one actuator, such as for example the conventional hydraulic cylinder-piston or jack device. Hence, one valve mechanism is enabled to perform the functions usually accomplished by three sets of controls; one for power mode, to position the control surface; one for autopilot mode, to move the control stick and linkage actuating the control surface; and one for damper mode operation used to automatically augment the stability characteristics of the aircraft. Hence, the mechanism of the invention is more compact; mechanically simplified; much lighter in weight and size; less expensive; and generally of less mechanical complexity and of improved overall reliability. Also, the electrical power requirement for the mechanism of the present invention when operating in the autopilot mode is appreciably reduced; and improved autopilot performance in terms of response is obtained, because of the greatly decreased inertia of the servomechanism moving parts as compared to that of the conventional control stick and linkage in the parallel type autopilot control system. Other features and advantages of the invention will be apparent from the disclosure in the specification and the accompanying drawing wherein the invention is shown as being embodied in the mechanism for control of aircraft aerodynamic surfaces; although it will be understood that the invention may be applied to other uses with equal facility.

In the drawing:

Fig. 2 is a schematic sectional view of the servomechanism component of the system of Fig. 1; and Fig. 3 is a view corresponding to Fig. 2, but of a modified form of servomechanism of the invention.

Figure 1:
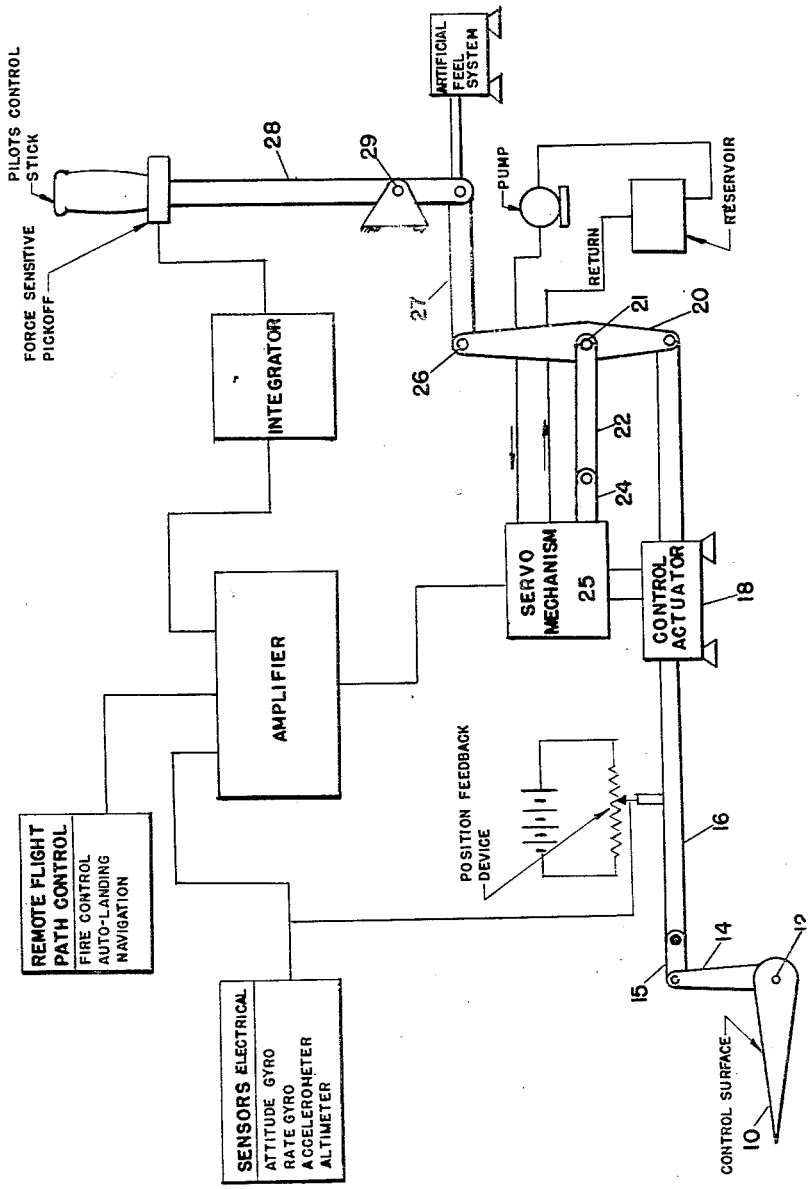
Fig. 1 is a schematic diagram of an aircraft control system embodying features and components of this invention.

Referring now to Fig. 1 of the drawing, the invention is illustrated therein as being applied to control of an aircraft movable aerodynamic surface 10, such as an elevator. It will of course be appreciated that the invention may be similarly applied by any appropriate linkage or the like to the control of other aircraft movable surfaces, such as ailerons, rudders, or the like. The control surface 10 is pivoted as indicated at 12 to the aircraft and is adapted to be swung about said pivot by means of lever arm 14 extending rigidly therefrom. A push-pull control rod for actuating the control surface 10 is illustrated at 15, and pivotally connects to one end of the piston rod 16 of a power control cylinder 18. The rod 16 extends through the cylinder 18 and pivotally connects at its other end to a lever 20 which is pivoted as at 21 to a push-pull rod 22 pivotally connecting to a control rod 24 extending through the servomechanism component of the control system as indicated generally at 25.

The lever 20 also pivotally connects as indicated at 26 to a link 27 extending into pivotal connection with the bottom end of the pilot control stick 28 which pivotally mounts upon the aircraft frame as indicated at 29. Thus it will be appreciated that the control system of Fig. 1 provides for direct hydro-mechanical control of the aerodynamic surface 10 in response to manual manipulations of the pilot control stick 28, as well as autopilot control of the aerodynamic surface through the servomechanism, as will be explained more fully hereinafter; as well as direct manual control of the aerodynamic surface whereby manual manipulations of the pilot control stick direction position the control surface without benefit hydraulic power.

Thus, for example as shown herein, the system may include autopilot position and rate gyros; accelerometers; an altimeter of either electrical or mechanical types; remote flight path controls, and the like. Also, as shown in Fig. 1, the system may conveniently include means whereby the pilot may for maneuvering purposes, adjust the autopilot control system by means of a pilot stick force pick-off or transducer sensing the pilot's force input at the control stick 28 and integrating this force signal and adding it to the automatic flight path reference signal as a continuing bias to the reference signal. A signal feed back and artificial control reaction "feel" means are preferably added to the system, all as indicated schematically in Fig. 1.

The improved servomechanism of the present invention which enables the control system to fulfill the objects and advantages hereinabove set forth is indicated generally at 25 in Fig. 1; and is illustrated in greater detail in Figs. 2, 3. For example, Fig. 2 illustrates one form of servomechanism of the invention such as may also be termed a multi-function controlled for use in hydraulic control systems. It is basically a control valve adapted to function in either of three modes of operation such as may be defined as "power control"; "autopilot" mode; and "damper" mode. The mechanism includes a valve body 45 which is transversely bored to accommodate a valve spool 48 and various hydraulic passageways as illustrated in Fig. 2 and more fully described hereafter.

When operated in the power control mode, the servomechanism valve spool 48 is actuated by manual displacement of the pilot control stick 28 which causes motion of the link 22. This causes the pivoted links 50, 51 to displace the valve spool 48 through means of intermediate bearing rods 52, 53, the links 50, 51 pivoting about the fulcrum pivots 54, 55. For example, actuation of the mechanism so as to displace lever 22 toward the left from the position thereof shown in Fig. 2 causes rod 53 to compress spring 60 and extend spring 61 and thereupon displace the valve spool 48 toward the left. Such displacement of valve spool 48 places a passageway 30 to the right hand end of cylinder 18 in communication with an hydraulic pressure supply passageway 31, and places a passageway 32 from the left hand end of cylinder 18 in communication with a return passageway 33, whereby piston 18' and rod 16 are caused to move to the left. The direction of movement is reversed upon displacement of valve spool 48 toward the right.

In this way, the control surface 10 is power actuated under the control of the pilot through his control stick 28.

In event sticking of the valve spool should develop, the pilot overcomes this simply by applying full forces to the control stick until the spool is freed subsequent to overcoming the compression force of spring 57 so that the lower end of link 51 acts as a fulcrum about the stop 63.

When operated in the autopilot mode, positioning of the valve spool 48 is controlled in proportion to electrical signals received by a flapper valve 64. The pilot first closes an autopilot "on" switch thereby energizing solenoids 65a—65a which then act to displace to the right hand position a selector valve spool 65. This causes system hydraulic pressure to be applied through passageways 34, 35 and 35' to the flapper valve 64 and also through passageway 38 and chamber 68, all comprising part of a secondary pressure fluid system to the lockout and damper pistons 58, 59, thereby causing the latter to extend outwardly until links 50, 51 make contact with stops 62, 63. Simultaneously, the pistons 58 and 59 bottom. Links 50, 51, and hence the connected control stick linkage, are then restrained to the body of the valve mechanism in both directions by a force equivalent to the system pressure times the area of the piston 58; and the bearing pins 52, 53 are retracted from the valve spool 48. System hydraulic pressure also is applied through passages 36, 36', chambers 70 and 71, and conduits 66 and 67 to chambers 39 and 39' at the opposite ends of spool 48. Hence, the flapper valve 64 is now enabled to control the position of the valve spool 48 by moving toward and away from orifices 37 and 37' in response to autopilot input signals thereby varying the pressure balance in conduits 66, 67 and chambers 39, 39' in a manner understood in the art. This chamber pressure differential displaces the spool 48 against the restoring force of the springs 60, 61 to control actuator 18 through the primary pressure fluid system.

The essential feature of the autopilot mode of operation is that the positioning of the spool 48 is isolated from the restraining inertia of the control stick and its associated linkage. Hence, it may be said that the control stick has in effect been decoupled from the control valve, permitting the latter to respond to autopilot input signals. In a typical control arrangement employing the servomechanism of the present invention, the power control actuator provides the power used to move the control stick and linkage so as to follow up the movements called for by the autopilot.

The magnitude of the decoupling force for a particular system is arranged to be sufficient to accelerate the control stick against its inertia and friction at the maximum rate needed by the autopilot system to satisfy its control response requirements. These acceleration forces react directly against the decoupling pistons 58, 59. Should it become necessary for the pilot to manually override the servomechanism when set in "autopilot" mode, he readily accomplishes this by directly applying a stick force in excess of the hydraulic restraints described hereinabove. In so doing, a manual recoupling of the control stick linkage to the power control spool is effected in the following manner.

When the override force exceeds the hydraulic decoupling force, and acts toward the left for example as viewed in Fig. 2, piston 59 is forced to the left, thereby displacing fluid back through passageway 38, around valve 65 and through supply passageway 31. When an override travel of sufficient distance has been obtained, bearing pin 53 presses directly on spool 48 and drives it against spool spring 60 and against the hydraulic pressure created by the autopilot signal in chambers 39, 39'. To disengage the autopilot, the pilot must open the autopilot "on" switch, whereupon the selector valve spool 65 returns to its center position, thereby shutting off the hydraulic pressure supply to the flapper valve 64 and valve spool chambers 39, 39', and opening lockout chamber 68 to return pressure chamber 69 through passageway 38.

When operated in the stability augmentation mode, positioning of the valve spool 48 is controlled in proportion to electrical signals received by the flapper valve mechanism 64 and control stick inputs 22. The pilot first closes a "damper on" switch, thereby energizing and moving selector valve 65 to the left. This causes system hydraulic pressure to be applied to the flapper valve 64 from supply passageway 31 through passageways 34, 35 and 35', and opens the flapper valve pressure chambers 70, 71 to the damper chambers 72, 73 which communicate with pistons 58 and 59 on the side thereof opposite chamber 68. Hence the flapper valve 64 is now enabled to control the position of the damper pistons 58, 59 by movement of valve 64 relative to orifices 37, 37', thereby varying the pressure balance in chambers 72, 73. This chamber pressure differential displaces the spools against the restoring force of the springs 56, 57 and the spool springs 60, 61.

For example, if the pressure in the chamber 73 is increased with respect to the pressure in chamber 72, the damper pistons 58, 59 will be displaced to the left and the valve spool 48 will also be displaced to the left resulting in actuator travel tot he right as previously described with reference to the power control mode of operation. The control stick lever 20 will then pivot about point 26 because the friction and inertia, reflected to point 26 required to move the power spool 48 is much less than that represented by the friction and spring force and inertia of the control stick and linkage. The actuator follow-up motion causes rod 22 to move to the right and return the valve spool 48 to its center position. The degree of control authority in stability augmentation mode of operation is determined by the spring rate of the members 60, 61, 56, 57 and the maximum differential pressure delivered from the flapper valve 64. Provisions for emergency operation in event of loss of hydraulic pressure may be included in the form of an actuator by-pass valve arrangement as indicated at 74.

Fig. 3 illustrates a servomechanism of the present invention arranged for installation in an airplane having dual hydraulic systems for control of a movable flight control surface thereof. In this form of the invention the valve body is indicated at 80 and encloses a four-way valve spool 82 which is operatively coupled to one of the airplane hydraulic systems as indicated at 84. A similar four-way valve spool 86 is provided in operative connection with the second hydraulic system 88 of the airplane. The valve spools 82, 86 are arranged to control the aircraft flight control actuator which is illustrated at the bottom of Fig. 3 to comprise a cylinder 18 in which is mounted a piston rod 16 extending for connection to the aircraft control surface or the like.

Thus, as shown at the bottom of Fig. 3, conduits 90, 92 hydraulically interconnect the valve 86 and the actuator 18. The valve 82 and the actuator 18 are similarly interconnected by other conduit devices (not shown). The valves 82, 86 are arranged to be actuated in response to manual manipulations of a pilot control system such as is illustrated in Fig. 3 to include a lever 20 pivotally connected at 21 to a push-pull rod 22 which is integral with a yoke member 94 and a piston rod 96. The yoke 94 carries a pair of push-rods 97, 98 which bear at their inner ends against corresponding ends of the valve spools 82, 86. The piston rod 96 carries integrally therewith a decoupler piston 100. A second yoke 102 mounted on a piston rod 104 and carrying another decoupler piston 106 is also provided with push rods 108, 109 which bear at their inner ends against the valve spools 82, 86, respectively.

A conduit 110 supplying fluid under pressure to opposite ends of the chamber enclosing the decoupler pistons 106, 100, and receiving fluid under pressure from the hydraulic supply system 84 of the airplane, normally operates to maintain the pistons 100, 106 in mutually abutting relation; thus biasing the yokes 94, 102 toward each other so that their push-rods 97, 98, 108, 109 bear at opposite ends against the valve spools 82, 86. Thus, it will be appreciated that movement of the pilot controlled push-pull rod 22 either toward the right or toward the left as push-pull rod 22 either toward the right or toward the left as viewed in Fig. 3 will act through yokes 94, 102, and their push rods 97, 98, 108 and 109 to cause the valve spools 82, 86 to be displaced in corresponding directions so as to thereby control the flow of hydraulic pressure from the airplane system into the actuator 18 in such manner as to cause the piston rod 16 thereof to be correspondingly displaced for control purposes. This mode of operation may be described as "manual" operation of the system. For example, movement of valve spool 86 to the left places the supply line 88' in communication with passageway 92, and places return line 88'' in communication with passageway 90, causing movement of piston 18' and rod 16 to the left. The reverse action occurs upon movement of valve spool 86 to the right, from its centered position.

A like action occurs with respect to valve spool 82. Movement thereof to the left places supply conduit 84' in communication with passageway 92', and places passageway 90' in communication with return line 84'', the passageways 90' and 92' corresponding to conduits 90 and 92 and communicating with actuator 18 through means not illustrated.

When it is desired by the pilot to transfer the control system of Fig. 3 from "manual" to "automatic," he operates a control which energizes a normally closed valve 112 so as to open a hydraulic pressure supply to a conduit 114. This pressure enters the decoupler piston chamber at a position between the pistons 100, 106, causing them to move away from each other, thus driving the yokes 94, 102 and the push-rods 97, 98, 108, 109 away from one another, so that the valve spools 82, 86 are no longer restrained except in response to the action of centering springs 116, 117, 118, 119.

When the solenoid valve 112 is open, fluid under pressure flows through a conduit 122, to a hydraulic amplifier as indicated at 125; which may be for example in the form of the flap valve 64 illustrated and described hereinabove in connection with Fig. 2. This amplifier converts signals supplied to it electronically as explained hereinabove, into pressure differences which are applied through conduits 126, 127 to the chambers at the opposite ends of valve spools 82, 86 in which are mounted the springs 116 and 117, and 118 and 119, respectively. Thus, a signal which raises the pressure in passage 126 relative to the pressure in passage 127 will cause the spools 82, 86 to move toward the right against the restraint of the springs 118, 119, thereby regulating flow of pressure fluid from supply conduits 84' and 88' through passageways 90' and 90, respectively (with return through passages 92 and 92' to lines 88'' and 84'', respectively) to the actuator 18 for corresponding actuation of the connected airplane control surface. A reversed pressure difference furnished by the amplifier 125 will, of course, result in reversed direction operation of the actuator 18. Stabilization and control of the airplane with the servomechanism in this mode of operation, can now be monitored by the actual gyroscope and associated autopilot equipment.

To disengage the autopilot it is only necessary for the pilot to deenergize the solenoid valve 112. This allows oil to escape from the chamber between the decoupler pistons 100, 106 through conduit 114, and thence through the amplifier 125 to the oil return conduit 130. In event of emergency or other need, the pilot may override the autopilot by forcing the pilot control stick to any desired position. For example, if he forces the stick 28 toward the right he thereby supplies the force difference which holds piston 100 against its stop, allowing the yoke 94 to push rods 97, 98 against the spools 82, 86. If the stick is moved toward the left the piston 100 moves the override piston 101 against the override spring 103. This pulls the piston 106 and hence the yoke 102 and push rods 108, 109, so that the spools are thereby moved toward the right.

Thus, it will be appreciated that by virtue of the present invention a single servomechanism is provided to perform the functions usually accomplished by three separate control mechanisms. The device provides a direct power control system with mechanical follow-up so arranged that the pilot's manual control is in effect coupled to the valve spool of a power control valve. Displacement of this valve spool by the pilot's manual control movement causes oil to flow to a hydraulic actuator which supplies the power for moving the aerodynamic control surface against the force of its aerodynamic loading. The interconnected linkage system feeds back in such manner as to null or center the power control valve spool when the control surface actuator has reached the new position called for by the pilot control movement.

The mechanism also provides a means for positioning the control surface in response to electrical input signals from one or more sensing elements. In this operational mode, the pilot control spool is normally uncoupled from the pilot's control stick. The spool and hence the control actuator are thus able to respond in optimum manner to electrical input signals; the spool being unrestrained from the inertia and friction of the pilot's stick and linkage. In this mode of operation the pilot control stick is coupled to and follows the movements of the control actuator. This coupling is effective up to a prescribed force beyond which the pilot can override any action of the electrical signal.

The invention also provides a means for positioning a control surface in response to an electrical input signal from an airframe stabilization system. In this mode of operation the stabilizing movements of the actuator and control surface are superimposed upon the pilot's positional input reference. These stabilizing movements reflect a minimum of force transients back to the pilot's stick. Due to the hydraulic locking characteristics of the system, when in other than manual mode, no aerodynamically induced loads on the control surface are transmitted back to the pilot's control. The electrical input operates the same transfer valve employed for the auto-pilot control mode discussed hereinabove. The stabilizing link action of the actuator feeds back mechanically to null the power valve spool, and this differential actuator movement is proportional to the amplitude of the electrical input signal. Also, the invention provides a control system functioning as described hereinabove but including means for sensing the pilot's force input at his controls; integrating the force signal; and adding the same to the automatic reference signal as the continuing bias to the reference signal; and may preferably include a means to apply an artificial feel to the pilot's control.

We claim:

1. A control system for an aircraft having a movable aerodynamic control surface, a member for moving said control surface, manual control means adjustable to cause movement of said member, a fluid-pressure responsive actuator connected to said member to motivate the latter in either direction from neutral, a valve device comprising means defining a primary pressure fluid system including a housing and valve spool means displaceable in opposite directions within said housing away from neutral position to control flow of fluid through said primary fluid system to said actuator, said manual control means including a member fulcrumed differentially upon said housing and upon said valve spool means and connected to bias said valve spool means in either direction away from neutral when said manual control member is unrestrained, said valve spool means including a piston in a fluid pressure chamber and conduit means arranged to apply differential fluid pressures against said piston, a pilot valve selectively controlling primary fluid pressure applications through said conduit means to said chamber, a pressure responsive device adapted when energized to restrain normal fulcruming motions of said manual control means on said housing, a secondary fluid pressure supply system operatively connected to said pressure responsive device and manually controllable to alternately restrain and restore normal fulcruming of said manual control means relative to said housing, whereby upon deenergization of said pressure responsive means said manual control will be permitted to displace said valve spool piston to selectively control motivations of said actuator through said primary fluid system, and whereby application of differential pressures against said piston as controlled by said pilot valve will cause displacement of said valve spool piston, electromagnetic means operable to bias said pilot valve to differentially actuate the valve spool means, and feed back means actuated by displacements of said spool means tending to null the pilot valve.

2. In a control system for an aircraft having a movable control surface, a member for moving said control surface, control means manually adjustable to cause movement of said member, a fluid-pressure responsive actuator connected to said member to motivate the latter in either direction from a neutral position, a valve device controlling said actuator comprising means defining a primary pressure fluid system including a housing enclosing valve spool means displaceable in opposite directions from a neutral position within said housing to control flow of pressure fluid through said primary fluid system to said actuator, said manual control means including a member fulcrumed differentially upon said housing and upon said valve spool means and connected to bias said valve spool means in either direction away from neutral when normal fulcruming of said manual control member is unrestrained, said valve spool means including a piston in a fluid pressure chamber and conduit means arranged to apply differential fluid pressures against said piston, a pilot valve selectively controlling primary fluid pressure applications to said chamber through said conduit means, a secondary pressure responsive device adapted to be energized to restrain normal fulcruming motions of said manual control means on said housing, a secondary fluid pressure supply system operatively connected to said pressure responsive device and manually controllable to alternately restrain and restore normal fulcruming of said manual control means relative to said housing, whereby upon deenergization of said pressure responsive means said manual control will be permitted to displace said valve spool means to selectively control motivations of said actuator through means of said primary fluid system, and whereby application of differential pressures against said piston as controlled by said pilot valve will cause displacement of said valve spool means, electromagnetic means operable to bias said pilot valve to differentially actuate the valve spool means, and feed back means actuated by displacements of said spool means tending to null the pilot valve.

3. In combination, a device to be moved having an actuating member connected thereto, control means manually manipulatable to cause movement of said member, a fluid-pressure responsive actuator connected to said member to motivate the latter, and a servo mechanism for controlling said actuator comprising means defining a primary pressure fluid system including a housing enclosing valve means displaceable within said housing to control flow of fluid through said primary fluid system to said actuator, said manual control means including a member fulcrumed upon said housing and connected to said valve means to bias said valve means when normal fulcruming of said manual control member is unrestrained, means including a pilot valve for selectively controlling primary fluid pressure applications to said valve means for displacing the same, a secondary pressure responsive device adapted to be energized to restrain normal fulcruming motions of said manual control means on said housing and a secondary fluid pressure supply system operatively connected to said pressure responsive device and manually controllable to alternately restrain and restore normal fulcruming of said manual control means relative to said housing, whereby upon deenergization of said pressure responsive means said manual control means will be permitted to displace said valve means to selectively control motivations of said actuator through means of said primary fluid system, and whereby application of differential pressures against said valve means as controlled by said pilot valve will cause displacement of said valve means.

4. In an aircraft control system, a movable flight control device, a member for moving said control device, manual control means adjustable to cause movement of said member, a fluid-pressure responsive actuator connected to said member to motivate the latter, and a valve mechanism controlling said actuator comprising means defining a primary pressure fluid system including a housing enclosing valve means displaceable relative to said housing to control flow of fluid through said primary fluid system to said actuator, said manual control means including a member fulcrumed differentially upon said housing and connected to bias said valve means when normal fulcruming of said manual control member is unrestrained, means including a pilot valve selectively controlling primary fluid pressure applications to said valve means for displacing the same, a secondary pressure system including a fluid pressure responsive device operable when energized to interfere with normal fulcruming motions of said manual control means on said housing and including a secondary fluid pressure supply source operatively connected to said pressure responsive device and manually controllable to alternately restrain and restore normal fulcruming of said manual control means relative to said housing, whereby upon deenergization of said pressure responsive device said manual control means will be permitted to displace said valve means to selectively control motivations of said actuator through means of said primary fluid system, and whereby application of differential pressures against said valve mechanism as controlled by said pilot valve will cause displacement of said valve means.

5. In an aircraft control system, a flight control device, a member for adjusting said device, control means manually movable to cause adjustment of said device, a fluid-pressure responsive actuator connected to said member to motivate the latter, and a valve mechanism controlling said actuator comprising means defining a primary pressure fluid system including a housing enclosing valve means displaceable relative to said housing to control flow of fluid through said primary fluid system to said actuator, said manual control means including a member fulcrumed differentially upon said housing and connected to bias said valve means when said manual control member is unrestrained, said valve means including a fluid-pressure responsive piston, means including a pilot valve selectively controlling primary fluid pressure applications to said valve means for displacing the same, a secondary pressure system including a fluid pressure responsive device operable when energized to restrain normal fulcruming motions of said manual control means on said housing and including a secondary fluid pressure supply source operatively connected to said pressure responsive device and manually controllable to alternately restrain and restore normal fulcruming of said manual control means relative to said housing, whereby upon deenergization of said pressure responsive means said manual control will be permitted to displace said valve means to selectively control motivations of said actuator through means of said primary fluid system, and whereby application of differential pressures against said valve mechanism as controlled by said pilot valve will cause displacement of said valve means.

6. In combination, a servo mechanism for actuating a device having an actuator member connected to said device, a manual control means manipulatable to cause movement of said member, and a fluid-pressure responsive actuator connected to said member to motivate the latter, said servo mechanism comprising means defining a primary pressure fluid system including a housing enclosing fluid pressure responsive valve means displaceable within said housing to control flow of fluid through said primary fluid system to said actuator, said manual control means including a member fulcrumed upon said housing and connected to said valve means to bias said valve means when said normal control member is unrestrained, means including a pilot valve for selectively controlling primary fluid pressure applications to said valve means for displacing the same, a secondary pressure responsive device adapted to be energized to restrain normal fulcruming motions of said manual control means on said housing and a secondary fluid pressure supply system operatively connected to said pressure responsive device and being manually controllable to alternately restrain and restore normal fulcruming of said manual control means relative to said housing, whereby upon deenergization of said pressure responsive means said manual control means will be permitted to displace said valve means to selectively control motivations of said actuator through means of said primary fluid system, and whereby application of differential pressures against said valve means as controlled by said pilot valve will cause displacement of said valve means.

References Cited in the file of this patent

UNITED STATES PATENTS

| | | |
|---|---|---|
| 2,678,177 | Chenery | May 11, 1954 |
| 2,705,940 | Edwards | Apr. 12, 1955 |
| 2,738,772 | Richter | Mar. 20, 1956 |
| 2,773,660 | Rasmussen | Dec. 11, 1956 |
| 2,801,618 | Place et al. | Aug. 6, 1957 |

UNITED STATES PATENT OFFICE

CERTIFICATE OF CORRECTION

Patent No. 2,950,703

August 30, 1960

Harold K. Fletcher et al.

It is hereby certified that error appears in the printed specification of the above numbered patent requiring correction and that the said Letters Patent should read as corrected below.

Column 3, line 21, after "benefit" insert -- of --; column 6, lines 3 and 4, strike out "push-pull rod 22 either toward the right or toward the left as"; column 10, line 32, for "normal" read -- manual --.

Signed and sealed this 11th day of April 1961.

(SEAL)
Attest:
ERNEST W. SWIDER

Attesting Officer

ARTHUR W. CROCKER
Acting Commissioner of Patents